United States Patent
Laricchia et al.

(10) Patent No.: US 9,302,204 B2
(45) Date of Patent: Apr. 5, 2016

(54) PROCESS FOR PURIFYING A DISULFIDE OIL AND AN APPARATUS RELATING THERETO

(75) Inventors: Luigi Laricchia, Arlington Heights, IL (US); Johnathan Andrew Tertel, Mt. Prospect, IL (US); Jasna Karagic, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 565 days.

(21) Appl. No.: 13/585,188

(22) Filed: Aug. 14, 2012

(65) Prior Publication Data

US 2014/0048484 A1   Feb. 20, 2014

(51) Int. Cl.
*B01D 35/00* (2006.01)
*B01D 17/04* (2006.01)
*B01D 37/00* (2006.01)

(52) U.S. Cl.
CPC .................................. *B01D 17/045* (2013.01)

(58) Field of Classification Search
CPC ........ B01D 15/00; B01D 17/00; B01D 17/02; B01D 17/0202; B01D 17/04; B01D 17/045; B01D 35/00; B01D 35/30; B01D 37/00; B01D 39/00; B01D 39/10; B01D 39/12

USPC ............. 208/208 R, 211, 212; 210/634, 638, 210/767, 799
See application file for complete search history.

(56) References Cited

U.S. PATENT DOCUMENTS

| | | | |
|---|---|---|---|
| 4,608,160 A * | 8/1986 | Zoch | 210/114 |
| 4,705,620 A | 11/1987 | Bricker et al. | |
| 5,237,823 A | 8/1993 | Cheung et al. | |
| 5,470,441 A | 11/1995 | Brown | |
| 7,326,333 B2 | 2/2008 | Laricchia et al. | |
| 7,833,499 B2 | 11/2010 | Zang et al. | |
| 2003/0019793 A1 | 1/2003 | Greaney et al. | |
| 2004/0175307 A1* | 9/2004 | Laricchia et al. | 422/189 |
| 2010/0122936 A1 | 5/2010 | Tertel et al. | |
| 2012/0000826 A1 | 1/2012 | Tertel | |
| 2012/0043259 A1 | 2/2012 | Norton | |

FOREIGN PATENT DOCUMENTS

| | | |
|---|---|---|
| CN | 101962566 | 2/2011 |
| JP | 04524517 | 8/2010 |
| RU | 2441688 C2 | 2/2012 |

* cited by examiner

*Primary Examiner* — Allison Fitzsimmons
(74) *Attorney, Agent, or Firm* — James C. Paschall

(57) ABSTRACT

One exemplary embodiment can be a process for purifying a disulfide oil. The process can include obtaining at least a portion of a disulfide oil coalesced from an alkaline stream, and passing the at least a portion of the disulfide oil through a mesh for recovering a purified disulfide oil stream.

7 Claims, 1 Drawing Sheet

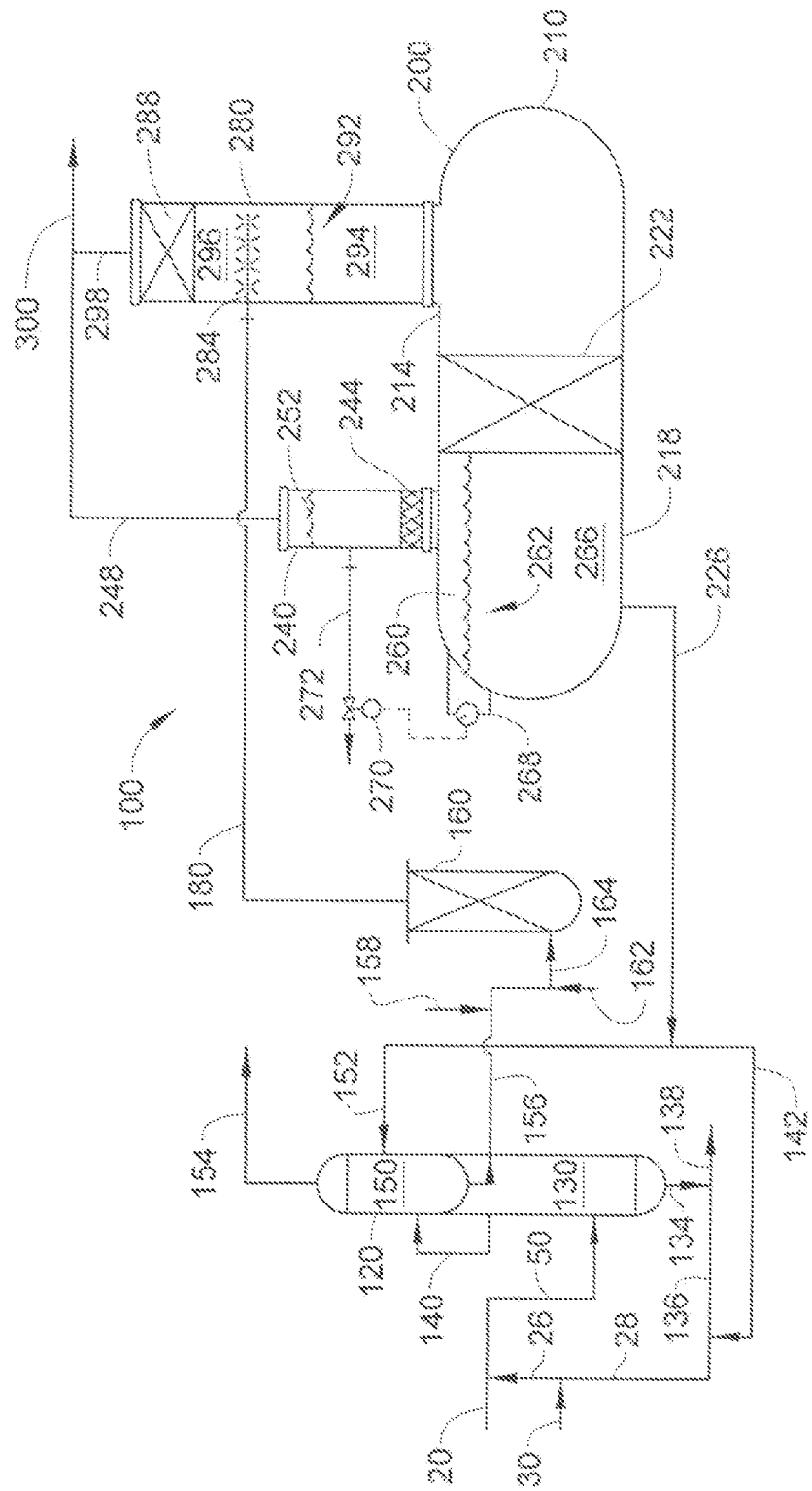

PROCESS FOR PURIFYING A DISULFIDE OIL AND AN APPARATUS RELATING THERETO

FIELD OF THE INVENTION

This invention generally relates to a process for purifying a disulfide oil and an apparatus relating thereto.

DESCRIPTION OF THE RELATED ART

Often, hydrocarbon and gas streams are treated to remove sulfur-containing compounds, such as one or more thiol compounds. Generally, such compounds are removed because of their malodorous scent.

A thiol compound can be designated R—S—H where R is often a light hydrocarbon radical such as methyl or ethyl. Typically, thiol compounds concentrate in hydrocarbon liquid streams separated in a process facility. Many processes can be used to remove thiols and other sulfur-containing compounds. Often, such processes can use a caustic stream contacting the hydrocarbon stream in an extractive system.

After use, the caustic stream may be regenerated. As such, air may be used for oxidizing the thiol compounds to disulfide oils. The unreacted components of the air stream, e.g. nitrogen, oxygen, and other inert gases, are separated from the caustic and disulfide oils. Often, a separation vessel allows the separation of a disulfide oil stream that contains remnants of caustic, which are desirably removed from the disulfide oil.

Often, it is desirable to minimize the number of equipment pieces to accomplish this task. A separate sand filter may be used to remove remnant amounts of caustic from the disulfide oil. As a consequence, it would be desirable to minimize the number of separate equipment pieces while removing undesirable components from disulfide oils in an economic and efficient manner to simplify construction and lower costs.

SUMMARY OF THE INVENTION

One exemplary embodiment can be a process for purifying a disulfide oil. The process can include obtaining at least a portion of a disulfide oil coalesced from an alkaline stream, and passing the at least a portion of the disulfide oil through a mesh for recovering a purified disulfide oil stream.

Another exemplary embodiment may be an apparatus. The apparatus can include a separation vessel. The separation vessel can include a base coupled to a first stack and a second stack. Often, the first stack includes a mesh and the second stack includes a packing.

A further exemplary embodiment can be a process for purifying a disulfide oil. The process can include sending a spent alkaline solution from an extractor vessel to an oxidation vessel, and sending an effluent from the oxidation vessel to a separation vessel. Often, the separation vessel has a base, a first stack, and a second stack. Usually, the second stack receives the effluent.

The embodiments disclosed herein can provide a vessel incorporating a stack for removing impurities, such as an alkaline liquid, e.g. caustic, to recover a purified disulfide oil. Such a design can reduce capital costs by combining functions into a single vessel and eliminate other equipment, such as a sand filter. Incorporating all the components into a single vessel can eliminate interconnecting piping due to the inclusion of a sand filter, as well as associated piping connection errors, and simplify maintenance by eliminating backwashing of the sand filter.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^−$, which is inclusive of the abbreviated one or more hydrocarbons. As an example, the abbreviation "$C3^+$" means one or more hydrocarbon molecules of three carbon atoms and/or more. In addition, the term "stream" may be applicable to other fluids, such as aqueous and non-aqueous solutions of alkaline or basic compounds, such as sodium hydroxide.

As used herein, the term "alkali" can mean any substance that in solution, typically a water solution, has a pH value greater than about 7.0, and exemplary alkali can include sodium hydroxide, potassium hydroxide, or ammonia.

As used herein, the term "vapor" can mean a gas or a dispersion that may include or consist of one or more hydrocarbons.

As used herein, the term "rich" can mean an amount of generally at least about 50%, and preferably about 70%, by mole, of a compound or class of compounds in a stream. With respect to extraction, an alkaline solution or a disulfide oil stream may be "rich" if such a liquid is at least partially saturated with one or more compounds, such as thiol compounds.

As used herein, the term "substantially" can mean an amount of generally at least about 80%, preferably about 90%, and optimally about 99%, by mole, of a compound or class of compounds in a stream.

As used herein, the term "lean" may mean a liquid, such as an alkaline solution or a disulfide oil stream, substantially devoid of one or more impurities, such as one or more thiol compounds or alkali.

As used herein, the term "thiol" can include a mercaptan and a salt thereof, such as a mercaptide. A thiol can be of the formula RSH or a salt of the formula $RS^−M^+$ where R is a hydrocarbon group, such as an alkyl or aryl group, that is saturated or unsaturated and optionally substituted, and M is a metal, such as sodium or potassium.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, an adsorber, or a vessel, can further include one or more zones or sub-zones.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a bolt, a staple, or a rivet; an adhesive; or a solder.

As used herein, the term "immiscible" means two or more phases that cannot be uniformly mixed or blended.

As used herein, the term "phase" means a liquid, a gas, or a suspension including a liquid and/or a gas, such as a foam, aerosol, or fog. A phase may include solid particles. Generally, a fluid can include one or more gases, liquids, and/or suspension phases.

As used herein, the term "killed carbon steel" generally means a carbon steel deoxidized by the addition of aluminum, ferrosilicon, or other suitable compounds while the mixture is maintained at melting temperature until all bubbling ceases. Typically, the steel is quiet and begins to solidify at once without any evolution of gas when poured into ingot molds.

As depicted, process flow lines in the FIGURE can be referred to interchangeably as, e.g., lines, pipes, liquids, oils, solutions, alkalines, caustic, catalyst, branches, portions, feeds, products, or streams.

BRIEF DESCRIPTION OF THE DRAWING

The FIGURE is a schematic depiction of an exemplary apparatus.

DETAILED DESCRIPTION

Referring to the FIGURE, an exemplary apparatus 100 for removing one or more sulfur-containing compounds, such as one or more thiol compounds, from a hydrocarbon stream 20 is depicted. Typically, the apparatus 100 can include an extractor vessel 120, an oxidation vessel 160, and a separation vessel 200. The vessels, lines and other equipment of the apparatus 100 can be made from any suitable material, such as carbon steel, killed carbon steel, stainless steel, or titanium.

The hydrocarbon stream 20 is typically in a liquid phase and can include a liquefied petroleum gas or a naphtha hydrocarbon. Typically, the hydrocarbon stream 20 contains sulfur compounds in the form of one or more thiol compounds and/or hydrogen sulfide. Generally, the apparatus 100 can also include a caustic prewash vessel. Exemplary apparatuses having at least a caustic prewash vessel, an extractor vessel, and an oxidation vessel for removing sulfur-containing compounds from a hydrocarbon stream are disclosed in, e.g., U.S. Pat. No. 7,326,333 and US 2010/0122936. These vessels can be in direct or indirect communication with each other as well as a separation vessel.

A hydrocarbon stream 20 can be an effluent from, for example, a separate prewash vessel. The hydrocarbon stream 20 can include hydrogen sulfide and one or more C2-C8 hydrocarbons. Usually, the hydrocarbon stream 20 can include up to about 100 ppm, by weight, hydrogen sulfide. Generally, the hydrocarbon stream 20 is combined with a stream 26 including water from a stream 30 and an alkaline solution stream 28, as hereinafter described, for removing, e.g., hydrogen sulfide. The alkali can be any caustic material, such as sodium hydroxide and potassium hydroxide, or ammonia, and is usually added to a liquid, e.g., water, to form an alkaline solution. The streams 20 and 26 are combined as an extractor feed 50. The extractor feed 50 can enter the extractor vessel 120. The extractor vessel 120 can include a lower prewash section 130, and an upper extractor section 150. The extractor feed 50 can enter the lower prewash section 130. A predominately hydrocarbon phase can rise while the alkaline solution can fall in the prewash section 130. The alkaline solution can be withdrawn via an alkaline solution withdrawal line 134 with a portion 138 being purged and another portion 136 being recycled. A transfer conduit 140 can transfer the hydrocarbon phase into the upper extractor section 150, which can be contacted with an alkaline solution 152, as hereinafter described, for extracting one or more thiol compounds from the hydrocarbon phase into the alkaline phase.

The hydrocarbon product 154 mostly free of one or more thiol compounds can be withdrawn from the top of the upper extractor section 150 while a spent alkaline solution including one or more thiol compounds can be withdrawn via a line 156. The spent alkaline solution 156 can be combined with an oxidation catalyst 158 and an air stream 162. The oxidation catalyst 158 can be any suitable oxidation catalyst, such as a sulfonated metal phthalocyanine. However, any suitable oxidation catalyst can be used such as those described in, e.g., U.S. Pat. No. 7,326,333. The oxidation catalyst 158, the air stream 162, and the spent alkaline solution 156 can be combined in a line 164 before entering the oxidation vessel 160. The spent aqueous alkaline solution and air mixture is distributed in the oxidation vessel 160. In the oxidation vessel 160, the one or more thiol compounds may catalytically react with oxygen and water to yield an alkaline solution and organic disulfides. Optionally, the oxidation vessel 160 can include packing, such as carbon rings, to increase the surface area for improving contact between the spent alkaline solution and catalyst.

Afterwards, an effluent 180 from the oxidation vessel 160 can be withdrawn from the top of the oxidation vessel 160. The effluent 180 can include an alkaline solution, one or more hydrocarbons, one or more sulfur compounds, and a gas. Typically, the effluent 180 can include a gas phase, a liquid disulfide phase, and a liquid aqueous alkaline solution phase, but may also be referenced as an alkaline stream 180, as the alkaline solution can be a primary component. Generally, the gas phase includes air with at least some oxygen depletion. In the gas phase, the oxygen content can be about 5-about 21%, by mole.

The effluent 180 can be received in the separation vessel 200. The separation vessel 200 can serve as a disulfide separator. The separation vessel 200 can include a base 210, a first stack 240, and a second stack 280. The separation vessel 200 can be operated at any suitable conditions, such as no more than about 60° C. and about 250-about 500 kPa, preferably about 350-about 450 kPa.

The base 210 can have any suitable dimensions. Typically, the base 210 may have a length greater than a height creating an interior space containing one or more coalescer elements 222. Usually, the one or more coalescer elements 222 can include at least one of a metal mesh, one or more glass fibers, sand, or an anthracite coal to facilitate separation of immiscible liquids of similar density. Generally, the base 210 has a top 214 and a bottom 218. Typically, the stacks 240 and 280 are, independently, coupled to the top 214 of the base 210 at any suitable angle. Preferably, each stack 240 and 280 are coupled at a substantially perpendicular orientation with respect to a length of the base 210. Usually, a level indicator controller 268 is coupled to the base 210 and communicates to a control valve 270 coupled to a line 272 containing a withdrawn disulfide or disulfide oil stream.

The first stack 240 may be any suitable dimension for receiving a disulfide oil and be substantially cylindrical in shape having one or more walls forming a void. The first stack 240 may contain a mesh 244 positioned near the base of the first stack 240. The mesh 244 can be made from any suitable material, such as metal. The metal may be carbon steel and/or stainless steel. The mesh 244 can be coated or uncoated. Usually, the height of the first stack 240 may be greater than the width.

The second stack or another stack 280 can be any suitable dimension for receiving the three-phase effluent 180. Typically, the height of the second stack 280 can be greater than the width. Generally, the second stack 280 is substantially cylindrical in shape having one or more walls forming a void.

At least a portion of a distributor 284 can be inserted into the void and a packing 288 may be positioned near the top of the second stack 280. Often, the distributor 284 can be any suitable distributor, such as respectively, a pipe with same or different sized slots for distributing the effluent 180 in the second stack 280. The distributor 284 can be placed below the packing 288 and can be any suitable distributor, such as an elongated pipe with one or more slots, or a distributor as disclosed in, e.g., U.S. Pat. Nos. 5,237,823 or 5,470,441. Although not depicted, a wash oil may be provided to the second stack 280 via a distributor, as disclosed in, e.g., US 2010/0122936. Usually, the packing 288, such as carbon rings, is used to increase the surface area for slowing fluid flow and facilitate condensation. Generally, the liquid phases fall downward toward the base 210 and the gas phase rises upward in the second stack 280 through the packing 288.

In operation, a hydrocarbon stream 20 may be combined with the stream 26 including a combined alkaline solution stream 28 that can enter the lower prewash section 130 of the extractor vessel 120. The hydrocarbon can rise and pass through the transfer conduit 140 to the upper extractor section 150 while the alkaline solution may fall and be withdrawn via the line 134 with a portion recycled and a portion purged. The hydrocarbon product 154 can be withdrawn from the top of the extractor vessel 120.

Alkaline solution rich in one or more thiol compounds from the upper extractor vessel 150 can be sent via a line 156 and be combined with the oxidation catalyst 158 and the air stream 162 prior to entering the oxidation vessel 160. The three-phase effluent 180 from the oxidation vessel 160 can be sent to the separation vessel 200.

The effluent 180 can separate in the second stack 280 with the gases rising forming a spent gas phase 296, including excess air and disulfide oil vapors, and the liquids falling towards the base 210 forming a liquid phase 294, thus creating separate phases. A gas-liquid interface 292 may be present in the second stack 280. The gases can rise in the second stack 280 and pass through the packing 288 removing any entrained liquid. Afterwards, the gases can pass through a line 298.

The liquids can enter the base 210, which may include one or more coalescer elements 222. The various liquid phases can pass through the one or more coalescer elements 222 and be separated into a disulfide oil 260 and a lean alkaline solution 266 forming a disulfide oil/alkaline solution interface 262, thus separate phases. Generally, the disulfide phase can rise and enter the first stack 240.

At least a portion, preferably all, of the disulfide oil can pass through the mesh 244 in the first stack 240 removing substantially all of the alkali, often caustic, present in the disulfide oil to purify the disulfide oil. Often, it is desirable to have no more than about 1 ppm, by weight, of a cation, such as sodium, present in a disulfide oil stream 272. The cation may be representative of the alkali present in the disulfide oil stream 272. A gas may be present in the first stack 240 forming a gas/disulfide oil interface 252 with the gas being at a pressure of about 300-about 600 kPa. The level of the interface 262 in the base 210 can be controlled by the level indicator controller 268 and the valve 270 that may control the amount of a disulfide stream 272 exiting the first stack 240. The gas can exit the first stack 240 as a spent gas stream 248 and be combined with the spent gas stream 298 to form a combined spent gas stream 300. As such, the gas can be sent or optionally blended with fuel gas for use as a fuel in a heater or furnace.

Generally, the lean alkaline solution 266 can exit the bottom 218 of the base 210 through a line 226 and be split into separate branches 142 and 152. The regenerated alkaline solution in the line 142 can be combined with the alkaline solution 136, and be added to the hydrocarbon stream 20. Another branch 152 can be provided to the upper extractor section 150 of the extractor vessel 120, as described above.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process to produce a purified disulfide oil stream, comprising:
    A) passing a liquid phase alkaline solution comprising the disulfide oil through one or more coalescer elements in a base of a vessel to produce a coalesced alkaline solution;
    B) separating at least a portion of the disulfide oil from the coalesced alkaline solution in the base of the vessel; and
    C) passing the at least a portion of the disulfide oil through a mesh in a stack of the vessel for recovering a purified disulfide oil stream.

2. The process according to claim 1, wherein the separating occurs in a separation portion of the base of the vessel and the disulfide oil and the alkaline solution form separate phases in the separation portion of the base of the vessel.

3. The process according to claim 1, wherein the stack additionally contains a gas phase.

4. The process according to claim 3, wherein the gas phase is at a pressure of about 200- about 600 kPa.

5. The process according to claim 2, further comprising controlling a level of a phase interface between the disulfide oil and the alkaline solution in the separation portion of the base of the vessel using a level indicator controller.

6. The process according to claim 1, wherein the one or more coalescer elements comprises at least one of a metal mesh, one or more glass fibers, a sand, or an anthracite coal.

7. The process according to claim 1 further comprising providing an effluent from an oxidation unit comprising a spent gas phase comprising air and disulfide vapors and the liquid phase alkaline solution to another stack of the vessel and separating the liquid phase alkaline solution from the spent gas phase.

* * * * *